United States Patent
Phillips

(10) Patent No.: US 8,226,515 B2
(45) Date of Patent: Jul. 24, 2012

(54) TWO-MODE HYBRID POWERTRAIN WITH TWO MOTOR/GENERATORS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/547,539

(22) Filed: Aug. 26, 2009

(65) Prior Publication Data

US 2011/0053724 A1    Mar. 3, 2011

(51) Int. Cl.
*F16H 3/72* (2006.01)
(52) U.S. Cl. .......................................... 475/5; 475/317
(58) Field of Classification Search ............... 475/5, 317
See application file for complete search history.

(56) References Cited

U.S. PATENT DOCUMENTS

2007/0219036 A1* 9/2007 Bucknor et al. ................. 475/5

* cited by examiner

*Primary Examiner* — David D Le
*Assistant Examiner* — Derek D Knight
(74) *Attorney, Agent, or Firm* — Quinn Law Group, PLLC

(57) ABSTRACT

A hybrid electromechanical transmission connectable with multiple power sources for launching and propelling a vehicle includes an output member and a stationary member. The transmission also includes a first planetary gear set and a second planetary gear set. The power sources include an engine, a first motor/generator and a second motor/generator. The engine, the first motor/generator and the second motor/generator are each operatively connected with the first planetary gear set, and the output member and the second motor/generator are each operatively connected with the second planetary gear set. Thus configured, the transmission provides both a forward under-drive gear for launching the vehicle and a forward direct drive gear for propelling the vehicle at higher speeds.

14 Claims, 2 Drawing Sheets

TWO-MODE HYBRID POWERTRAIN WITH TWO MOTOR/GENERATORS

TECHNICAL FIELD

The invention relates to a hybrid electromechanical powertrain having two motor/generators.

BACKGROUND OF THE INVENTION

To produce a more efficient vehicle, common hybrid vehicle powertrains combine an electric motor and a conventional engine. Torque from the engine and the electric motor is typically channeled to the vehicle's driven wheels via a transmission. Efficiency of a hybrid vehicle powertrain is typically related to the percentage of time and during what type of driving conditions the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle.

A hybrid powertrain utilizing an engine and two electric motors may connect the engine and the electric motors to a transmission such that torque and speed of the engine may be selected independently of vehicle speed and desired acceleration. Such control of the engine is typically achieved by varying individual torque contribution from the two electric motors. Thus, a hybrid powertrain utilizing an engine in combination with two electric motors may provide suitable torque contribution from each of the engine and the two motors and afford improved overall vehicle efficiency.

SUMMARY OF THE INVENTION

A hybrid electromechanical transmission connectable with multiple power sources for launching and propelling a vehicle is provided, and includes an output member and a stationary member. The transmission also includes a first planetary gear set and a second planetary gear set. The power sources include a first motor/generator, a second motor/generator and an engine. The engine, the first motor/generator and the second motor/generator are each operatively connected with the first planetary gear set, and the output member and the second motor/generator are each operatively connected with the second planetary gear set. Thus configured, the transmission provides two forward gear ratios or modes. The transmission provides a forward low gear ratio, i.e., a forward under-drive mode, for launching the vehicle. The transmission also provides a forward direct drive gear ratio, i.e., a forward direct-drive mode, for propelling the vehicle at higher speeds.

The transmission may include a first torque-transmitting device and a second torque-transmitting device. The first planetary gear set may include a first, a second, and a third member, and likewise the second planetary gear set may include a first, a second, and a third member. In such a configuration, the first torque-transmitting device is engageable to ground the first member of the second planetary gear set to the stationary member, and the second torque-transmitting device is engageable to lock one of the first, second and third members of the second planetary gear set to another member of the second planetary gear set.

The engine may be operatively connected to the first member of the first planetary gear set, and the second member of the second planetary gear set may be operatively connected to the third member of the first planetary gear set. The first motor/generator may be operatively connected to the second member of the first planetary gear set, and the second motor/generator may be operatively connected to the second member of the second planetary gear set. The second member of the second planetary gear set may be operatively connected to the third member of the first planetary gear set, and the output member may then be operatively connected to the third member of the second planetary gear set.

As disclosed, the transmission may provide the forward under-drive mode via engaging the first torque-transmitting device and disengaging the second torque-transmitting device. Additionally, the transmission may provide the direct drive mode via engaging the second torque-transmitting device and disengaging the first torque-transmitting device.

The transmission may further include a third torque-transmitting device. In such a case, the third torque-transmitting device is engageable to ground the engine to the stationary member. Such engagement of the third torque-transmitting device permits the transmission to provide the forward under-drive mode and the reverse under-drive mode for launching the vehicle via at least one of the first motor/generator and the second motor/generator. Any of the first torque-transmitting device, the second torque-transmitting device and the third torque-transmitting device may have the capability to transmit torque in two directions and be configured as either a selectively engageable clutch or a brake.

In the transmission, the respective operative connections of the power source and of the motor/generators with the first and the second planetary gear sets may facilitate a controlled selection of speeds and torques of the power source and of the motor/generators for launching and propelling the vehicle.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
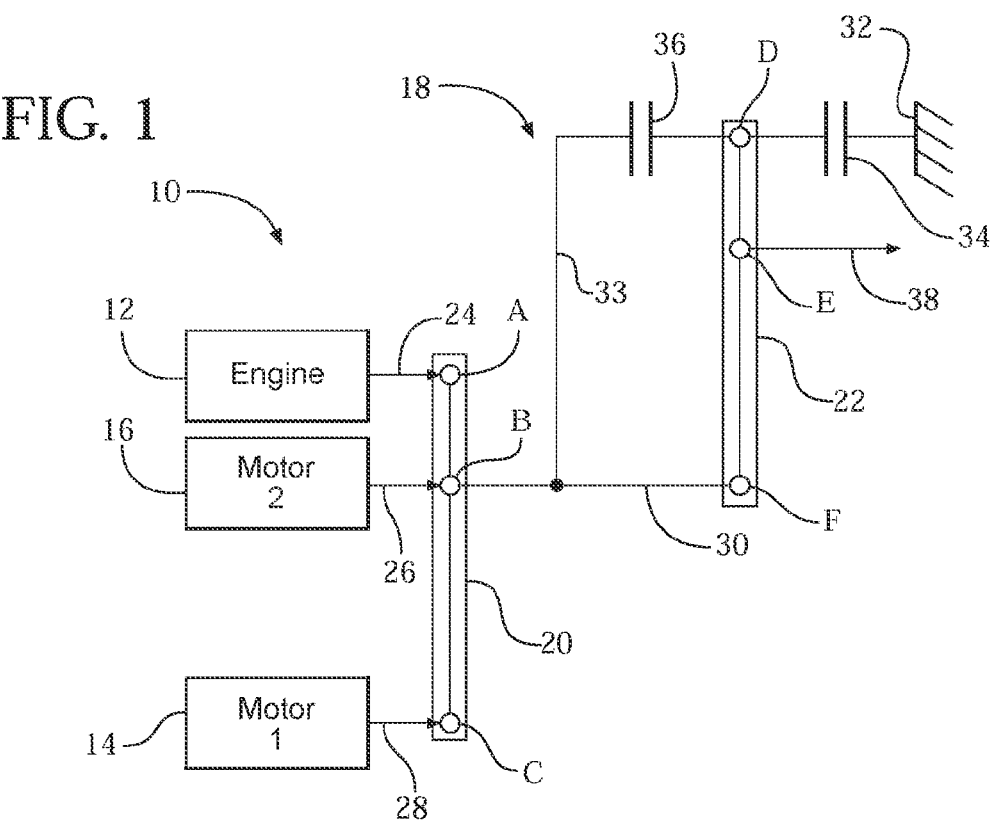
FIG. 1 is a schematic lever diagram illustration of an electrically variable transmission employed in a hybrid powertrain.

Referring to the drawings, wherein like reference numbers refer to like components, FIG. 1 illustrates a hybrid powertrain 10. The hybrid powertrain 10 includes multiple power sources, which include an internal combustion engine 12, a first electric motor/generator 14, and a second electric motor/generator 16, all connected to an "electrically variable transmission" (EVT) designated generally by the numeral 18. As is known by those skilled in the art, an "electrically variable transmission" constitutes a transmission planetary gear train operatively connected with each of the engine 12, the first motor/generator 14 and the second motor/generator 16. Channeling respective torques of the engine 12 and the two motor/generators 14 and 16 to different members of the planetary gear train permits one of the power sources to either assist or balance the operation of any of the other two. Thus, the combination of one engine 12 and two motor/generators 14 and 16 operatively connected to the EVT 18 allows speeds and torques of the engine and motor/generators to be controlled and selected independently in order to power a subject vehicle more efficiently. Furthermore, the connections of the hybrid powertrain 10, to be described in greater detail below, may permit an overall decrease in torque requirement from the combination of the first and the second motor/generators 14 and 16 while affording acceptable vehicle performance, as compared with other systems.

The EVT 18 includes two planetary gear sets represented in lever diagram form in FIG. 1. A lever diagram is a schematic representation of the components of a mechanical device such as an automatic transmission. Each individual lever represents a planetary gear set or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

A lever or first planetary gear set 20 includes a first, second, and third nodes, A, B and C, respectively. The nodes A, B, and C represent a first, second and third members of the first planetary gear set 20, preferably a ring gear member, a carrier member and a sun gear member, although not necessarily in that order. The EVT 18 also includes a second planetary gear set 22, which includes a fourth, fifth and sixth nodes, D, E and F, respectively. Analogous to gear set 20, the nodes D, E, and F represent a first, second and third members of the second planetary gear set 22, preferably a ring gear member, a carrier member and a sun gear member, although, again, not necessarily in that order.

Engine 12, first electric motor/generator 14, and second electric motor/generator 16 are operatively connected to the EVT 18 via an input member arrangement. The input member arrangement from the power sources provides torque to the EVT 18. The input member arrangement includes an output shaft of the engine 12 which serves as an input member 24, a rotor of the second motor/generator 16 that serves as an input member 26, and a rotor of the first motor/generator 14 that serves as an input member 28. The input member 24 is configured to provide engine torque to the EVT 18. The input member 26 and input member 28 are each configured to provide torque from the second motor/generator 16 and from the first motor/generator 14, respectively, to the EVT 18. The first node A is continuously connected to the input member 24, the second node B is continuously connected to the input member 26, and the third node C is continuously connected to the input member 28.

A first interconnecting member 30 continuously interconnects the second node B with the sixth node F. The fourth node D is selectively connectable with a stationary member or housing 32 of the EVT 18 via a first torque-transmitting device 34, to thereby ground the fourth node. The second node B is selectively connectable with the fourth node D by way of a second interconnecting member 33 via a second torque-transmitting device 36. The first and second torque-transmitting devices 34 and 36 may be configured as selectively or automatically engageable, and be capable of transmitting torque in two directions, as understood by those skilled in the art. Well known examples of torque-transmitting devices capable of transmitting torque in two directions are friction plate-type clutches, brakes, and dog clutches. The fifth node E is continuously connected with the output member 38, which provides output torque for launching and propelling the vehicle.

As understood by those skilled in the art, the powertrain 10 additionally has an electric power source (not shown), such as one or more batteries. The power source is operatively connected to the motor/generators 14 and 16 such that the motor/generators may transfer power to or receive power from the engine 12. Although not shown, the powertrain 10 also includes a controller or an electronic control unit (ECU). The controller is operatively connected to the electric power source to control the distribution of power from or to the power source.

Figure 1A:
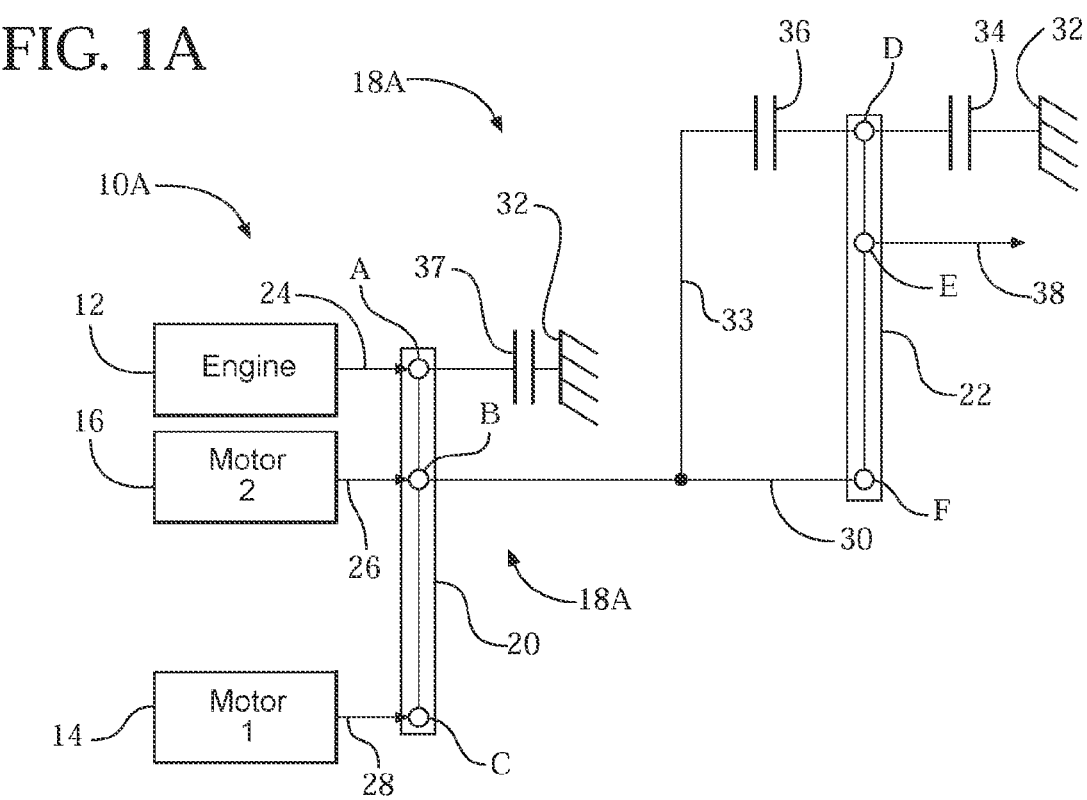
FIG. 1A is a schematic lever diagram illustration of an electrically variable transmission having an optional engine grounding torque-transmitting device.

FIG. 1A depicts a powertrain 10A which is identical to powertrain 10 shown in FIG. 1 in all respects other than having a third torque-transmitting device 37, with all identical elements numbered correspondingly. The third torque-transmitting device 37 is selectively engageable as a brake to ground the engine 12 to the stationary member 32, to thereby ground the first node A. Similarly to the first and second torque-transmitting devices 34 and 36, the third torque-transmitting device 37 may be configured as selectively or automatically engageable, and be capable of transmitting torque in two directions.

Figure 2:
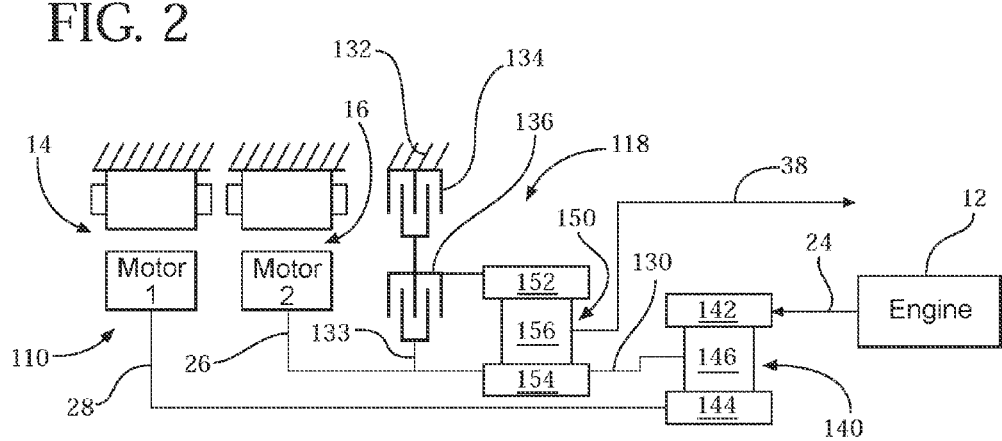
FIG. 2 is a schematic stick diagram illustration of the powertrain corresponding with the lever diagram of FIG. 1.

FIG. 2 depicts a powertrain 110 having an EVT 118. The powertrain 110 is a specific embodiment of a powertrain 10 shown in FIG. 1. The EVT 118 is represented by a schematic stick diagram that depicts specific planetary gear set connections corresponding to, and reflected by the lever diagram of FIG. 1. Although a specific powertrain 110 is represented, it will be understood that the particular embodiment is simply exemplary in nature, and other powertrain arrangements within the scope of the lever diagram of FIG. 1 are also contemplated.

The EVT 118 utilizes two differential gear sets, preferably in the nature of a first planetary gear set 140 and a second planetary gear set 150. First planetary gear set 140 employs a ring gear member 142, which circumscribes a sun gear member 144. A carrier member 146 rotatably supports a plurality of pinion gears that meshingly engage both the ring gear member 142 and the sun gear member 144. The first motor/generator 14 is continuously connected to the sun gear member 144. The engine 12 is continuously connected to the ring gear member 142.

The second planetary gear set 150 employs a ring gear member 152, which circumscribes a sun gear member 154. A carrier member 156 rotatably supports a plurality of pinion gears that meshingly engage both the ring gear member 152 and the sun gear member 154. The output member 38 is continuously connected with the carrier member 156. An interconnecting member 130 continuously connects the carrier member 146 with the sun gear member 154. The second motor/generator 16 is continuously connected with the sun gear member 154, and is thereby also continuously connected to carrier member 146. The interconnecting member 130 may be one component or separate components. Thus, one member of the planetary gear set 140 is continuously connected with one member of the planetary gear set 150 via one interconnecting member 130. Accordingly, the connection and interaction between planetary gear sets 140 and 150 is reflected by the lever diagram depicted in FIG. 1.

The ring gear member 142 corresponds with the first node A of FIG. 1. The carrier member 146 corresponds with the second node B of FIG. 1. The sun gear member 144 corresponds with the third node C of FIG. 1. The ring gear member 152 corresponds with the fourth node D of FIG. 1. The carrier member 156 corresponds with the fifth node E of FIG. 1. The sun gear member 154 corresponds with the sixth node F of FIG. 1, and is continuously connected with the carrier member 146, a.k.a. second node B. As will be readily understood by those skilled in the art, the EVT 18 is appropriate for a front wheel drive vehicle architecture, as the output member 38 is in a location well suited for a transverse arrangement common to front wheel drive vehicle applications.

The first torque-transmitting device 134 is selectively engageable to ground the ring gear member 152 with a stationary member 132, e.g. the transmission housing. The second torque-transmitting device 136 is selectively engageable to connect the ring gear member 152 with the sun gear member 154, and also to connect the input member 26 with the ring gear member 152 via an interconnecting member 133. The torque-transmitting devices 134 and 136 are engageable in like manner as corresponding torque-transmitting devices 34 and 36, respectively of FIG. 1, to establish first and second electrically variable forward modes.

The first electrically variable forward mode of powertrain 10 shown in FIG. 1 is an under-drive connection between the second motor/generator 16 and the output member 38, established by engaging the first torque-transmitting device 34 and disengaging the second torque-transmitting device 36. The under-drive forward mode provides an advantageous low gear ratio, i.e., greater than 1:1, between the input member 26 and the output member 38, thereby multiplying torque developed by the second motor/generator 16 to permit the second motor/generator, even without the aid of the engine 12, to adequately launch the vehicle. The second electrically variable forward mode is a direct drive connection between the second motor/generator 16 and the output member 38, established by disengaging the first torque-transmitting device 34 and engaging the second torque-transmitting device 36. The direct drive forward mode provides a 1:1 gear ratio between the input member 26 and the output member 38, thereby permitting the torque developed by the second motor/generator 16 to sustain higher vehicle speeds.

Figure 2A:
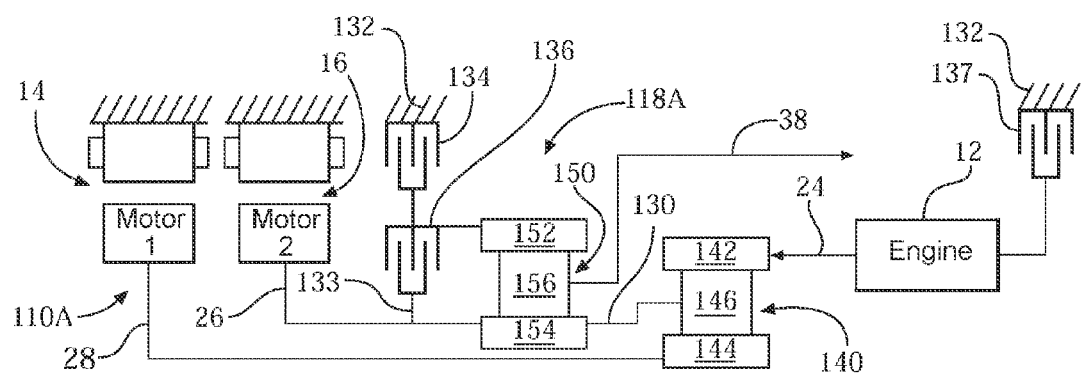
FIG. 2A is a schematic stick diagram illustration of the powertrain corresponding with the lever diagram of FIG. 1A.

FIG. 2A depicts a powertrain 110A having an EVT 118A which is identical to powertrain 110 shown in FIG. 2 in all respects other than having a third torque-transmitting device 137, with all identical elements numbered correspondingly. The powertrain 110A is a specific embodiment of a powertrain 10A shown in FIG. 1A. The EVT 118A is represented by a schematic stick diagram that depicts specific planetary gear set connections corresponding to, and reflected by the lever diagram of FIG. 1A. Although a specific powertrain 110A is represented, it will be understood that the particular embodiment is simply exemplary in nature, and other powertrain arrangements within the scope of the lever diagram of FIG. 1A are also contemplated. The third torque-transmitting device 137 is engageable as a brake in like manner as corresponding torque-transmitting device 37 of FIG. 1A. By engaging the third torque-transmitting device 137, and thereby grounding the engine 12, the transmission 18A is enabled to provide a forward under-drive mode and a reverse under-drive mode for launching the vehicle via a combination of the first motor/generator 14 and the second motor/generator 16.

A vehicle employing powertrain 10 or 10A may be launched from rest in the forward under-drive mode and then switched to being propelled in the forward direct drive mode to sustain higher vehicle speeds. The second motor/generator 16 may be sized sufficiently to provide ample torque to both launch the vehicle in the forward under-drive mode, and propel the vehicle in the forward direct drive mode of the EVT 18 over a wide range of speeds without assist from either the first motor/generator 14 or the engine 12. In the event the vehicle is required to generate a speed or pull a load that exceeds power capacity of the second motor/generator 16, torque from the first motor/generator 14 and/or the engine 12 may be added to assist the second motor/generator.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical transmission connectable with multiple power sources for launching and propelling a vehicle, comprising:
 an output member;
 a stationary member; and
 a first planetary gear set and a second planetary gear set, wherein each of the respective first and second planetary gear sets includes a first, a second, and a third member;
the power sources including:
 a first motor/generator;
 a second motor/generator; and
 an engine;
wherein:
 the engine, the first motor/generator, and the second motor/generator are each continuously connected with the first planetary gear set, and the output member and the second motor/generator are each operatively connected with the second planetary gear set, such that the transmission provides both a forward under-drive mode for launching the vehicle and a forward direct drive mode for propelling the vehicle at higher speeds.

2. The transmission of claim 1, further comprising:
 a first torque-transmitting device and a second torque-transmitting device; wherein:
 the first torque-transmitting device is engageable to ground the first member of the second planetary gear set to the stationary member; and
 the second torque-transmitting device is engageable to lock one of the first, second, and third members of the second planetary gear set to another member of the second planetary gear set.

3. The transmission of claim 2, wherein:
 the engine is operatively connected to the first member of the first planetary gear set;
 the first motor/generator is operatively connected to the second member of the first planetary gear set;
 the second motor/generator is operatively connected to the second member of the second planetary gear set;
 the second member of the second planetary gear set is operatively connected to the third member of the first planetary gear set; and
 the output member is operatively connected to the third member of the second planetary gear set.

4. The transmission of claim 2, wherein engaging the first torque-transmitting device and disengaging the second torque-transmitting device transfers torque from the at least one of the engine, the first motor/generator and the second motor/generator to the output member and provides the forward under-drive mode.

5. The transmission of claim 2, wherein engaging the second torque-transmitting device and disengaging the first torque-transmitting device transfers torque from at least one of the engine, the first motor/generator and the second motor/generator to the output member and provides the forward direct drive mode.

6. The transmission of claim 2, further comprising a third torque-transmitting device, wherein the third torque-transmitting device is engageable to ground the engine to the stationary member, sufficiently such that the transmission provides a reverse under-drive mode for launching the vehicle via at least one of the first motor/generator and the second motor/generator.

7. The transmission of claim 6, wherein any of the first torque-transmitting device, the second torque-transmitting device and the third torque-transmitting device is one of a selectively engageable clutch and a selectively engageable brake capable of transmitting torque in two directions.

8. The transmission of claim 1, wherein the respective operative connections of the engine and of the motor/generators with the first and the second planetary gear sets facilitate a controlled selection of speeds and torques of the engine and of the motor/generators for launching and propelling the vehicle.

9. A hybrid powertrain for launching and propelling a vehicle, comprising:
   an engine;
   a first motor/generator and a second motor/generator; and
   an electrically-variable transmission having:
      an output member;
      a stationary member;
      a first planetary gear set and a second planetary gear set, wherein each of the respective first and second planetary gear sets have a first, a second, and a third member;
      a first torque-transmitting device and a second torque transmitting device, wherein the first torque-transmitting device is engageable to ground the first member of the second planetary gear set to the stationary member, and the second torque-transmitting device is engageable to lock one of the first, second, and third members of the second planetary gear set to another member of the second planetary gear set;
   wherein:
      the first motor/generator is operatively connected for rotation with the second member of the first planetary gear set, and the second motor/generator is operatively connected for rotation with the second member of the second planetary gear set and continuously connected for rotation with the third member of the first planetary gear set;
      the output member is operatively connected for rotation with the third member of the second planetary gear set; and
      the powertrain includes both a forward under-drive mode for launching the vehicle and a forward direct drive mode for propelling the vehicle at higher speeds.

10. The hybrid powertrain of claim 9, wherein engaging the first torque-transmitting device and disengaging the second torque-transmitting device provides the under-drive mode.

11. The hybrid powertrain of claim 9, wherein engaging the second torque-transmitting device and disengaging the first torque-transmitting device provides the direct drive mode.

12. The hybrid powertrain of claim 9, further comprising a third torque-transmitting device, wherein the third torque-transmitting device is engageable to ground the engine to the stationary member, sufficiently such that the transmission provides a reverse under-drive mode for launching the vehicle via at least one of the first motor/generator and the second motor/generator.

13. The hybrid powertrain of claim 12, wherein any of the first torque-transmitting device, the second torque-transmitting device and the third torque-transmitting device is one of a selectively engageable clutch and a selectively engageable brake capable of transmitting torque in two directions.

14. The hybrid powertrain of claim 9, wherein the respective operative connections of the engine and of the motor/generators with the first and the second planetary gear sets facilitate a controlled selection of speeds and torques of the engine and of the motor/generators for launching and propelling the vehicle.

\* \* \* \* \*